(12) United States Patent
Achenbach

(10) Patent No.: US 9,778,548 B2
(45) Date of Patent: Oct. 3, 2017

(54) QUICK CONNECT CAMERA MOUNTING SYSTEM

(71) Applicant: Kenneth John Achenbach, Whistler (CA)

(72) Inventor: Kenneth John Achenbach, Whistler (CA)

( * ) Notice: Subject to any disclaimer, the term of this patent is extended or adjusted under 35 U.S.C. 154(b) by 0 days.

(21) Appl. No.: 15/345,665

(22) Filed: Nov. 8, 2016

(65) Prior Publication Data

US 2017/0108760 A1    Apr. 20, 2017

Related U.S. Application Data

(63) Continuation-in-part of application No. 15/298,972, filed on Oct. 20, 2016, now abandoned.

(60) Provisional application No. 62/244,129, filed on Oct. 20, 2015.

(51) Int. Cl.
| | | |
|---|---|---|
| *G03B 17/56* | (2006.01) | |
| *F16B 2/06* | (2006.01) | |
| *F16B 2/18* | (2006.01) | |
| *F16M 11/04* | (2006.01) | |

(52) U.S. Cl.
CPC ............. *G03B 17/561* (2013.01); *F16B 2/06* (2013.01); *F16B 2/185* (2013.01); *F16M 11/041* (2013.01)

(58) Field of Classification Search
CPC .......................... F16M 11/041; G03B 17/561
USPC .......................... 396/419–428; 348/373–376
See application file for complete search history.

(56) References Cited

U.S. PATENT DOCUMENTS

2015/0286115 A1* 10/2015 Koch ...................... B62J 11/00
                                                                    248/615

* cited by examiner

*Primary Examiner* — Rochelle-Ann J Blackman
(74) *Attorney, Agent, or Firm* — PatentFile, LLC; Bradley C. Fach; Steven R. Kick

(57) ABSTRACT

In some embodiments, a quick connect camera mounting system may include a camera mount which may be removably coupled to a base by removably coupling a post collar to a mounting post. A lock bar may be movably coupled to the post collar. The mounting post may include a lock notch which may be configured to receive a portion of the lock bar when the post collar is mated to the mounting post. A lock lever may be coupled to the lock bar which may move a portion of the lock bar into the lock notch when the post collar is mated to the mounting post thereby coupling the camera mount to the base. The camera mount may be uncoupled from the base by moving the lock lever to remove the lock bar from the lock notch and then by separating the mounting post from the post collar.

20 Claims, 11 Drawing Sheets

QUICK CONNECT CAMERA MOUNTING SYSTEM

CROSS REFERENCE TO RELATED APPLICATIONS

This application claims priority to and the benefit of the filing date of U.S. patent application Ser. No. 15/298,972, filed on Oct. 20, 2016, entitled "QUICK CONNECT CAMERA MOUNTING SYSTEM" which in turn claims priority to and the benefit of the filing date of U.S. Provisional Application No. 62/244,129, filed on Oct. 20, 2015, entitled "QUICK CONNECT CAMERA MOUNTING SYSTEM", both applications of which are hereby incorporated by reference in their entirety.

FIELD OF THE INVENTION

This patent specification relates to the field of camera positioning and mounting systems. More specifically, this patent specification relates to a system for quickly connecting a camera for mounting and positioning purposes.

BACKGROUND

In the world of extreme sports filmmaking, filmmakers must often choose between cheap equipment that does not provide the quality needed by many filmmakers, and professional equipment that is bulky and expensive, often requiring trained personnel to operate. Filming and photographing extreme sports on location with professional equipment and a film crew is prohibitively expensive for most filmmakers, while cheap equipment can break or lead to poor quality results.

While there are camera mounting and positioning systems in the art, they are limited in many aspects. They are configured for a limited amount of mounting and positioning options and are unable to work with different systems and cameras resulting in the filmmaker needing multiple systems for each video shoot. Often the filmmaker is the only person on the film crew and is also required to appear in the shot. To get these shots, filmmakers have created all sorts of homemade attachments, accessories, and mounts which are frequently made from sticks, cardboard, scavenged parts, and even duct tape. These temporary solutions are specific to each filmmaker's needs for a particular situation and must be disassembled once the needs or available equipment changes. A significant amount of time and money can be wasted on trying to fabricate or reconfigure a camera mount for different situations resulting in longer and more expensive film production.

Therefore a need exists for a novel camera mounting systems. There is also a need for novel systems to be able to secure a camera to a variety of structures in order to accommodate small or no film crew situations. A further need exists, for novel systems which are rapidly reconfigurable and interchangeable to adapt to different environments. Finally, a need exists for novel camera mounting systems which are able to quickly connect and disconnect from a camera.

BRIEF SUMMARY OF THE INVENTION

A quick connect camera mounting system for removably coupling a camera mount to a base is provided. In some embodiments, the system may include a post collar which may include a collar mating surface. A portion of the collar mating surface may be formed by a first retaining arm and a second retaining arm. A lock bar may be movably coupled to the first retaining arm and the second retaining arm of the post collar. The system may also include a mounting post which may have a lock notch and a post mating surface. The post mating surface may contact the collar mating surface when the post collar and mounting post are mated together. A lock notch may be configured to receive a portion of the lock bar when the post collar is mated to the mounting post. A lock lever may be coupled to the lock bar. The lock lever may be moved into a locked position to draw the retaining arms together to increase the frictional resistance between the collar mating surface and the post mating surface. The lock lever may be moved into an unlocked position to allow the retaining arms to move apart to decrease the frictional resistance between the collar mating surface and the post mating surface.

In further embodiments, a quick connect camera mounting system may include a post collar having a collar mating surface and the post collar may be coupled to a camera mount. A first retaining arm may be coupled to the post collar, and a second retaining arm may be coupled to the post collar. A lock bar having a first end and a second end, and the first end may be movably coupled to the first retaining arm and the second end may be movably coupled to the second retaining arm. A mounting post may be coupled to a base, and the mounting post may include a lock notch and a post mating surface. The post mating surface may contact the collar mating surface when the post collar and mounting post are mated together. A lock lever may be coupled to the second end of the lock bar, and the lock lever may be movable between a locked position and an unlocked position. The lock bar may be moved into the lock notch when the lock lever is moved into the locked position when the post collar and mounting post are mated together, and the lock bar may be moved out of the lock notch when the lock lever is moved into the unlocked position when the post collar and mounting post are mated together.

In still further embodiments, a quick connect camera mounting system may include a post collar having a collar mating surface and the post collar may be coupled to a base. A first retaining arm may be coupled to the post collar, and a second retaining arm may be coupled to the post collar. A lock bar having a first end and a second end, and the first end may be movably coupled to the first retaining arm and the second end may be movably coupled to the second retaining arm. A mounting post may be coupled to a camera mount, and the mounting post may include a lock notch and a post mating surface. The post mating surface may contact the collar mating surface when the post collar and mounting post are mated together. A lock lever may be coupled to the second end of the lock bar, and the lock lever may be movable between a locked position and an unlocked position. The lock bar may be moved into the lock notch when the lock lever is moved into the locked position when the post collar and mounting post are mated together, and the lock bar may be moved out of the lock notch when the lock lever is moved into the unlocked position when the post collar and mounting post are mated together.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Figure 1:
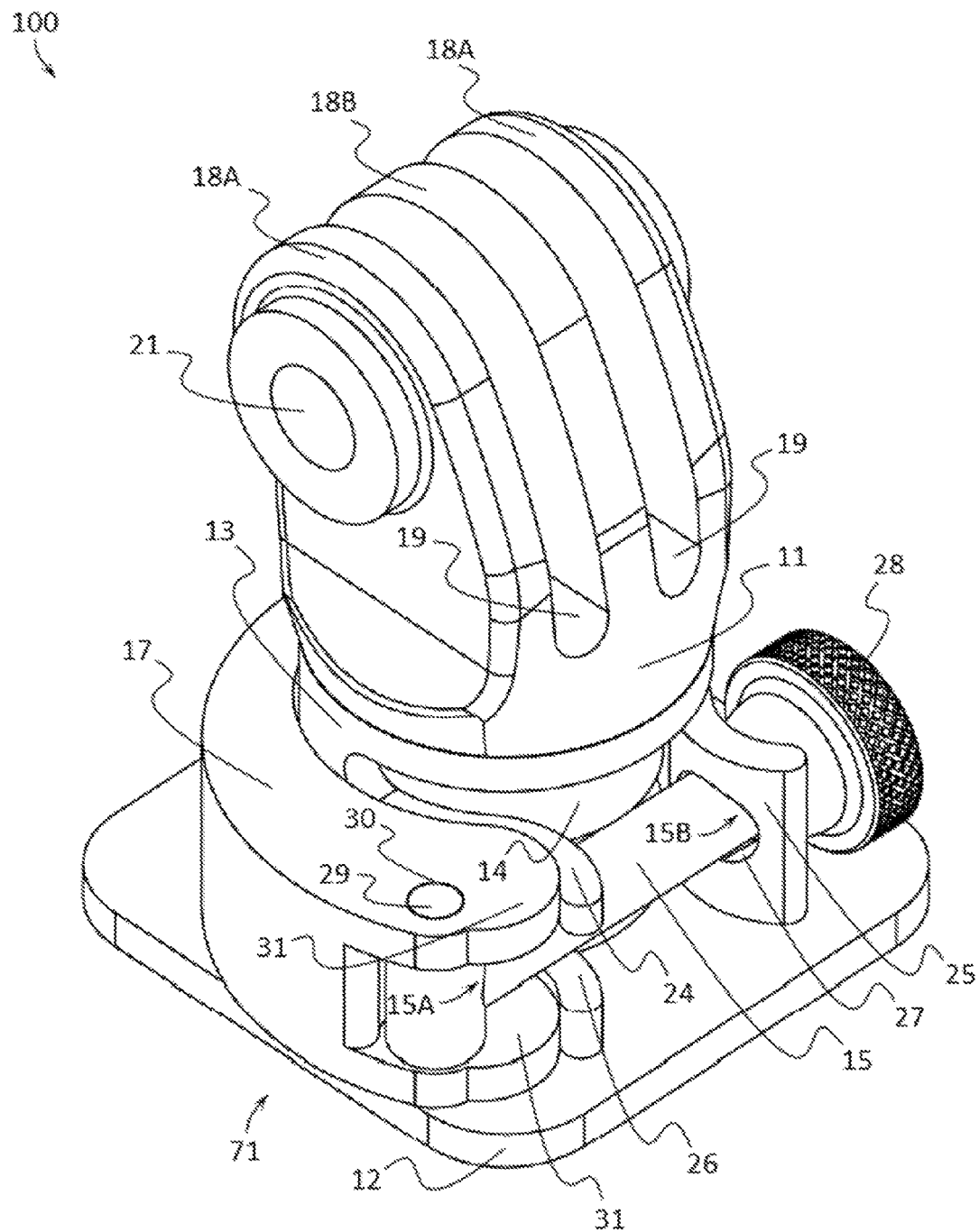
FIG. 1 depicts a perspective view of an example of a connected quick connect camera mounting system according to various embodiments described herein.
Figure 2:
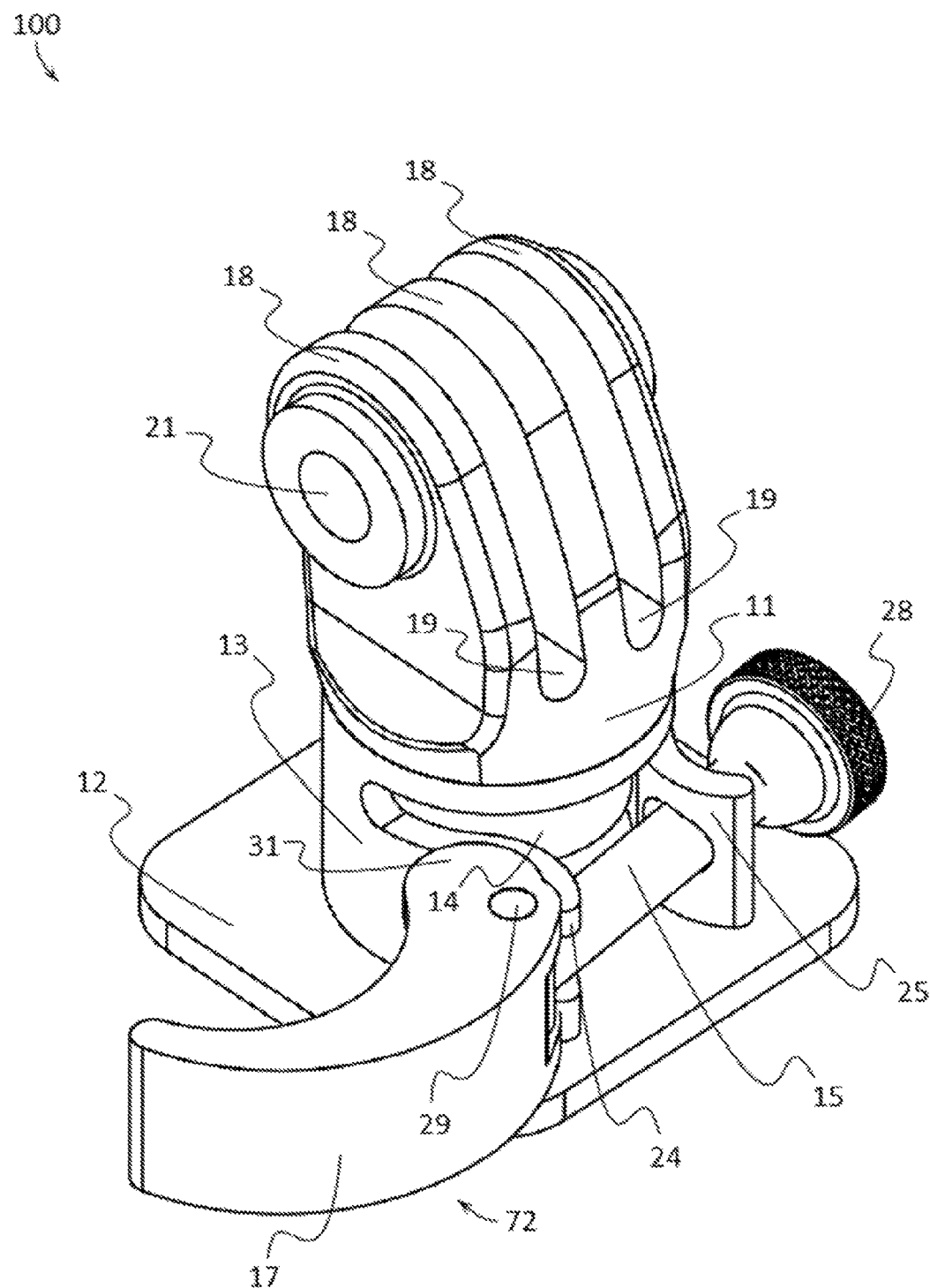
FIG. 2 illustrates a perspective view of an example of a quick connect camera mounting system with the lock lever in an unlocked position according to various embodiments described herein.

For purposes of description herein, the terms "upper", "lower", "left", "right", "rear", "front", "side", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 10% of the specified number. Additionally, as used in this application, the term "substantially" means that the actual value is within about 10% of the actual desired value, particularly within about 5% of the actual desired value and especially within about 1% of the actual desired value of any variable, element or limit set forth herein.

A new quick connect camera mounting system is discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Figure 3:
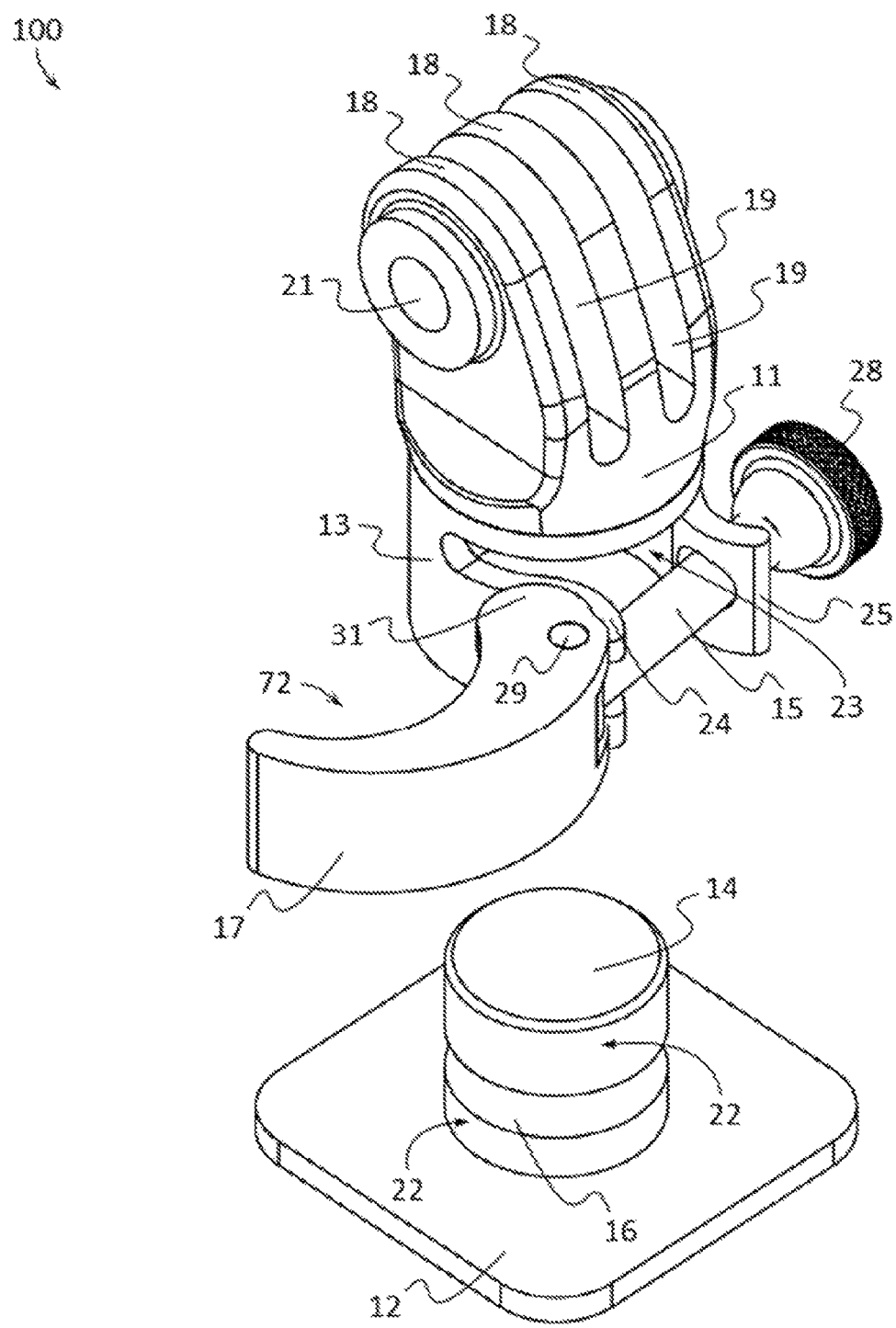
FIG. 3 shows a perspective view of an example of a disconnected quick connect camera mounting system according to various embodiments described herein.
Figure 4:
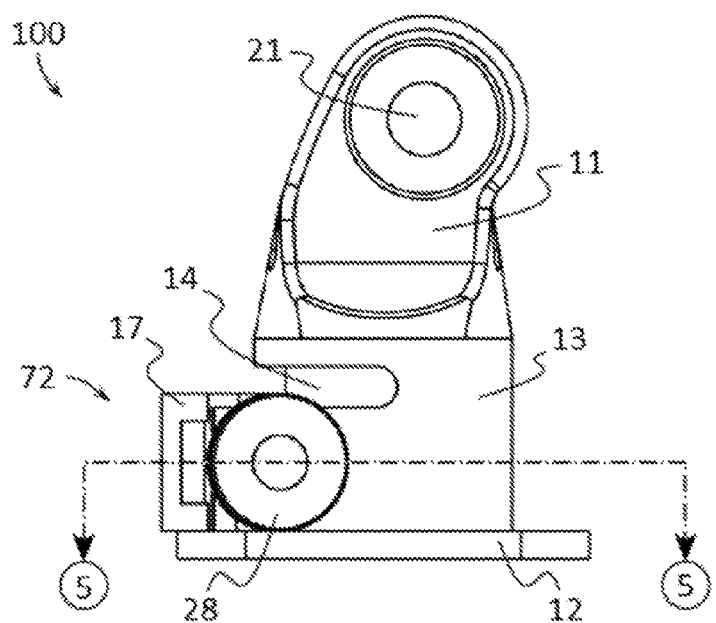
FIG. 4 depicts an elevation view of an example of a quick connect camera mounting system with the lock lever in an unlocked position according to various embodiments described herein.
Figure 5:
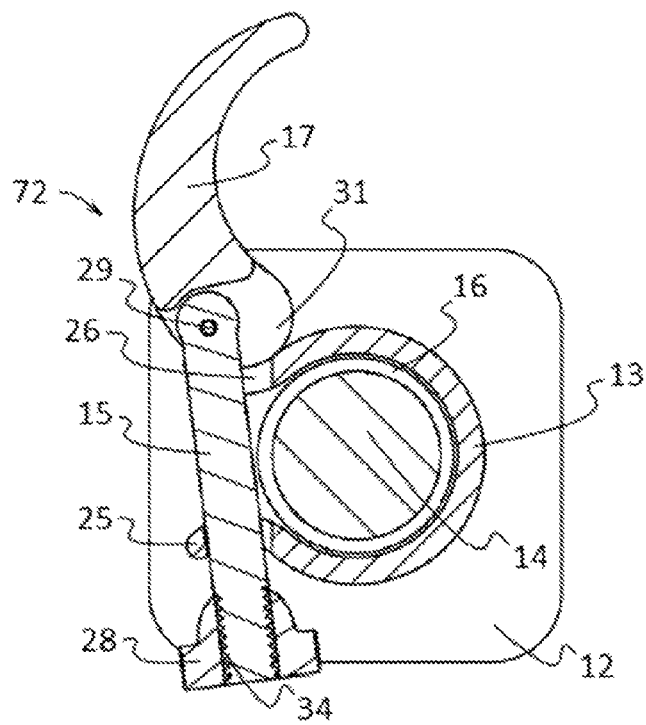
FIG. 5 illustrates a sectional, through line 5-5 shown in FIG. 4, plan view of an example of a quick connect camera mounting system with the lock lever in an unlocked position according to various embodiments described herein.
Figure 6:
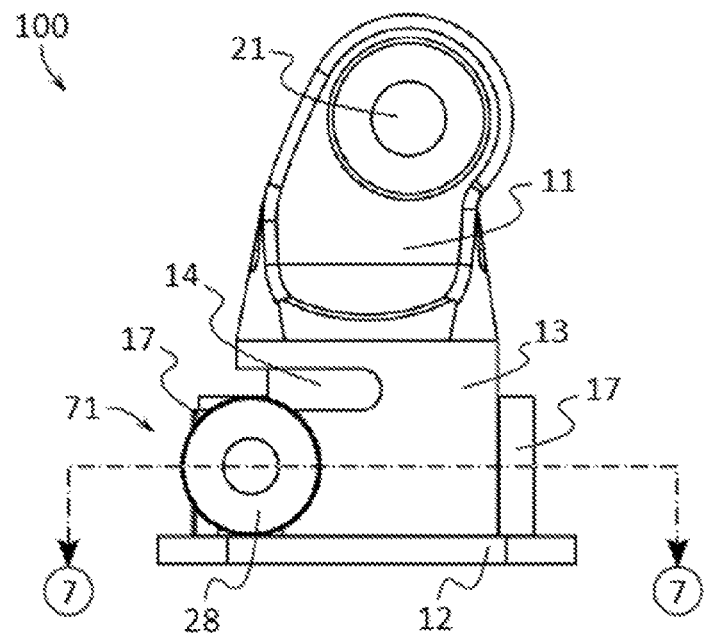
FIG. 6 shows an elevation view of an example of a quick connect camera mounting system with the lock lever in a locked position according to various embodiments described herein.
Figure 7:
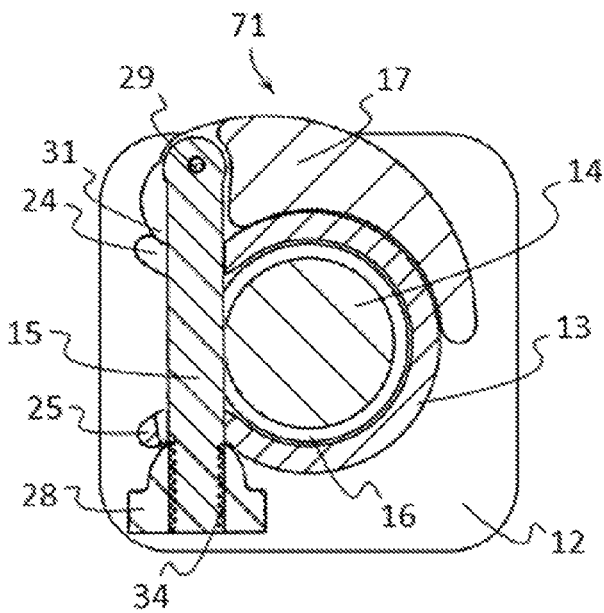
FIG. 7 depicts a sectional, through line 7-7 shown in FIG. 6, plan view of an example of a quick connect camera mounting system with the lock lever in a locked position according to various embodiments described herein.
Figure 11:
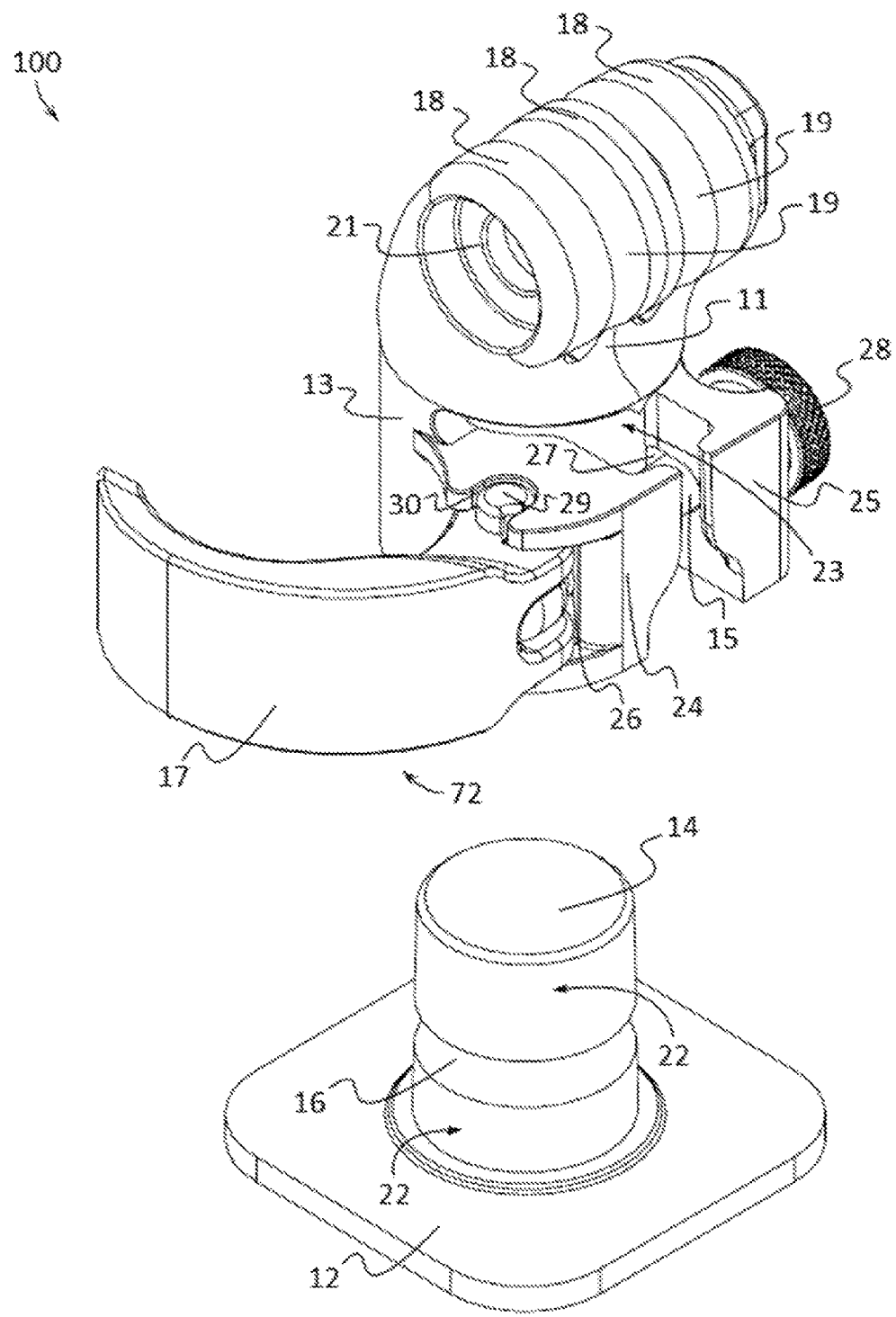
FIG. 11 illustrates a perspective view of another example of a disconnected quick connect camera mounting system according to various embodiments described herein.
Figure 12:
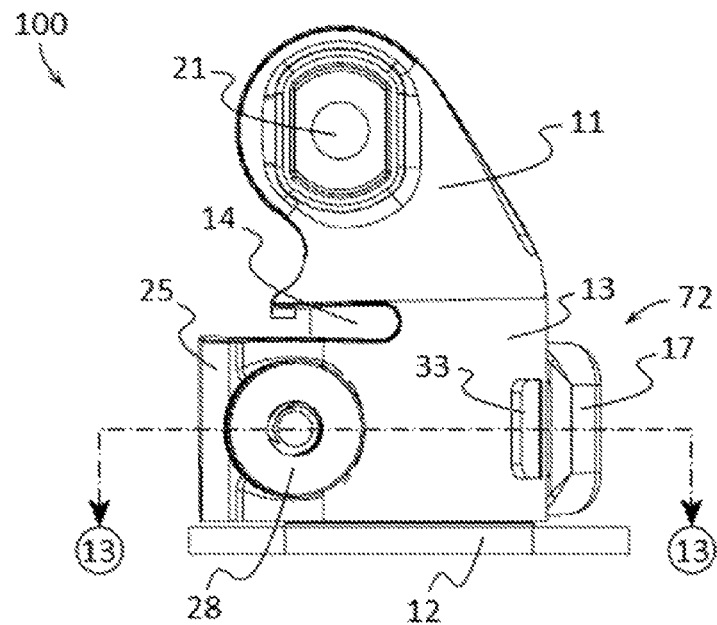
FIG. 12 shows an elevation view of another example of a quick connect camera mounting system with the lock lever in an unlocked position according to various embodiments described herein.
Figure 13:
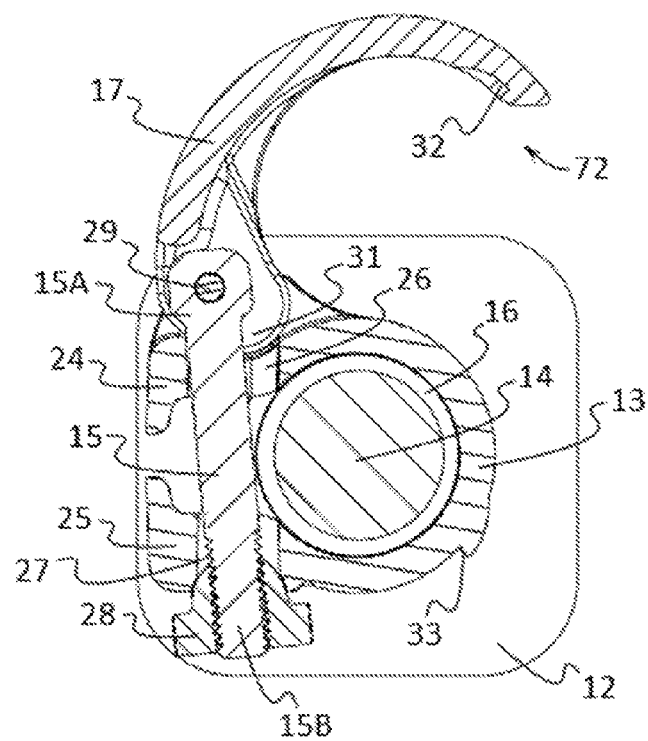
FIG. 13 depicts a sectional, through line 13-13 shown in FIG. 12, plan view of an example of a quick connect camera mounting system with the lock lever in an unlocked position according to various embodiments described herein.
Figure 14:
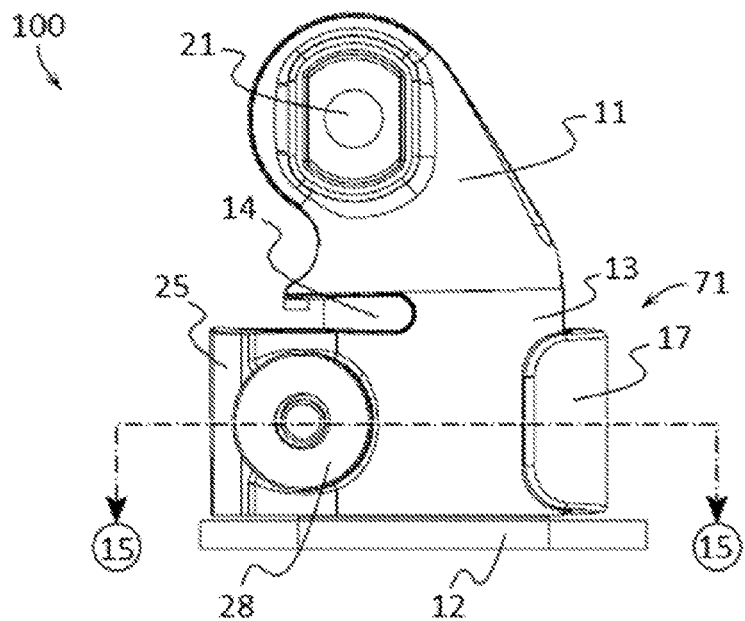
FIG. 14 illustrates an elevation view of another example of a quick connect camera mounting system with the lock lever in a locked position according to various embodiments described herein.
Figure 15:
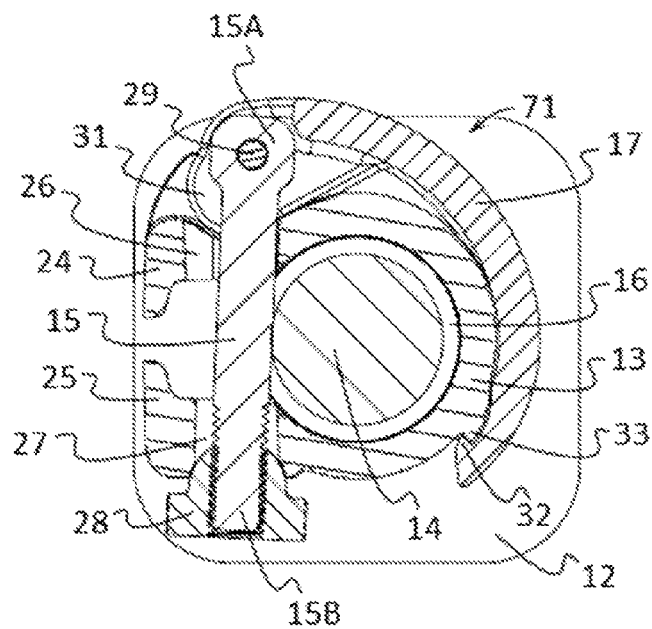
FIG. 15 shows a sectional, through line 15-15 shown in FIG. 14, plan view of an example of a quick connect camera mounting system with the lock lever in a locked position according to various embodiments described herein.

The present invention will now be described by example and through referencing the appended figures representing preferred and alternative embodiments. FIGS. 1-15 illustrate examples of a quick connect camera mounting system ("the system") 100 according to various embodiments. In some embodiments, the system 100 may comprise a camera mount 11 which may be removably coupled to a base 12 by removably coupling a post collar 13 to a mounting post 14. In further embodiments and as best shown in FIGS. 3 and 11, the post collar 13 may be coupled to the camera mount 11 and the mounting post 14 may be coupled to the base 12. In alternative embodiments and as best shown in FIG. 9, the post collar 13 may be coupled to the base 12 and the mounting post 14 may be coupled to the camera mount 11.

Figure 8:
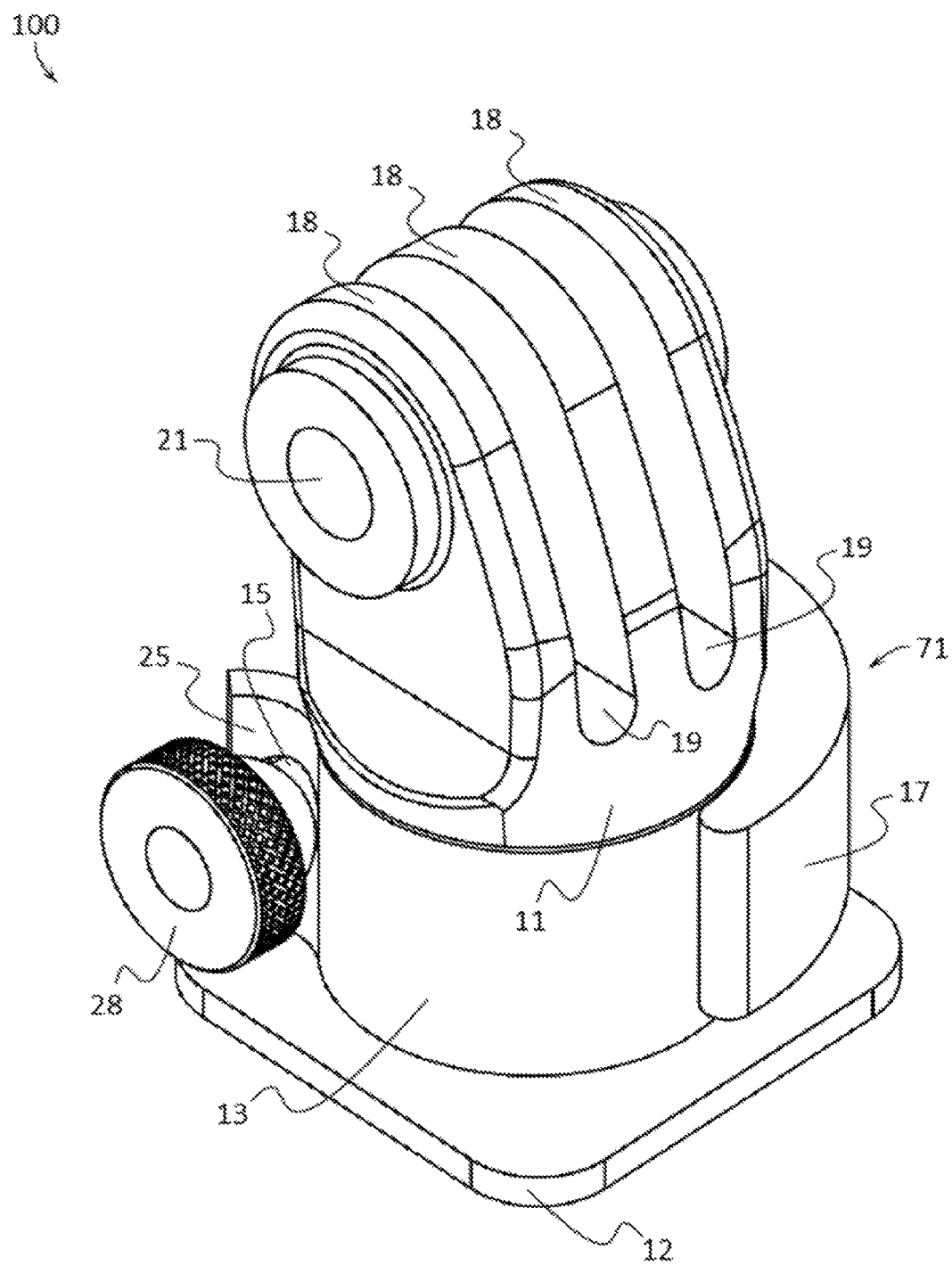
FIG. 8 illustrates a perspective view of an alternative example of a connected quick connect camera mounting system according to various embodiments described herein.
Figure 9:
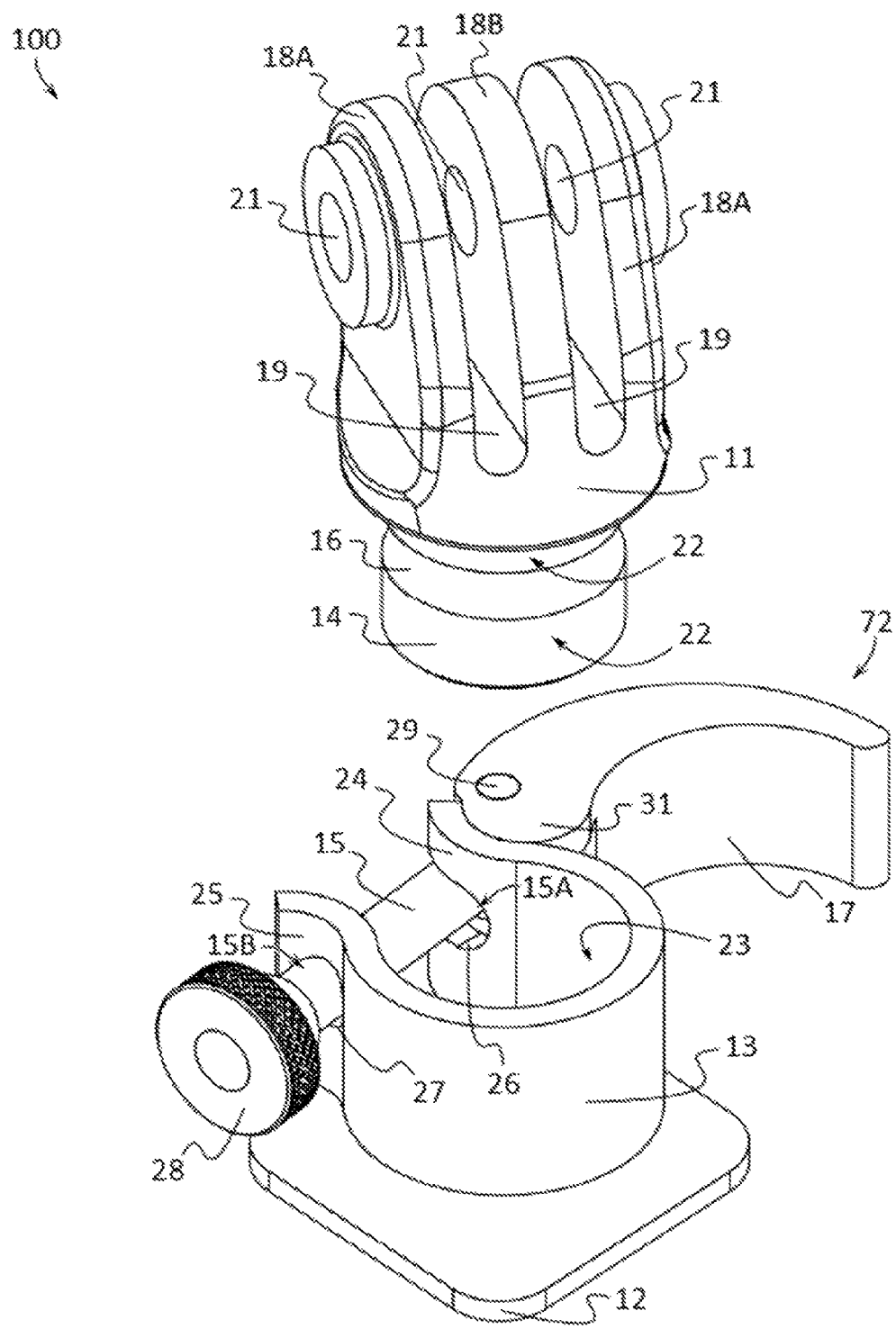
FIG. 9 shows a perspective view of an alternative example of a disconnected quick connect camera mounting system according to various embodiments described herein.
Figure 10:
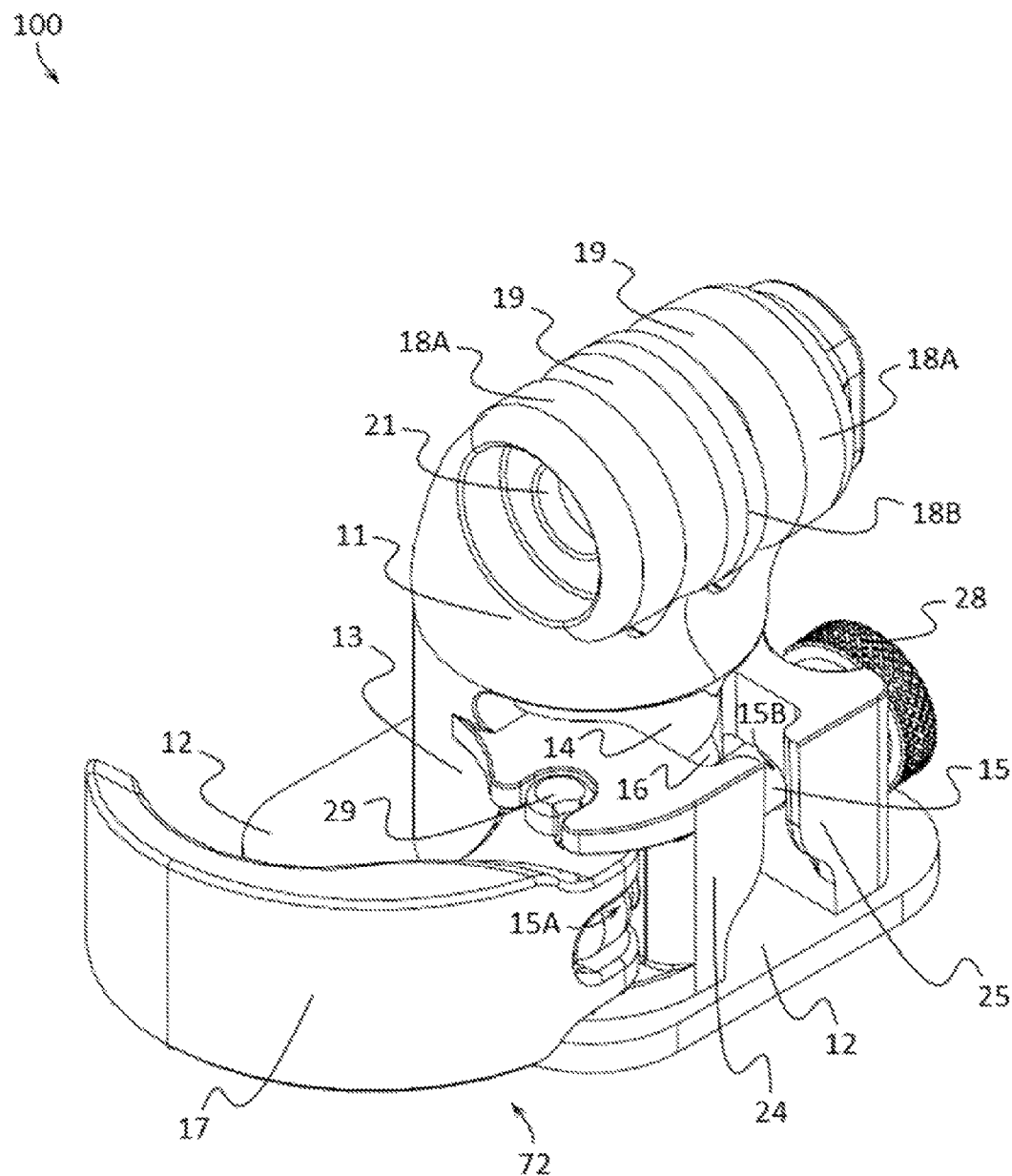
FIG. 10 depicts a perspective view of another example of a quick connect camera mounting system with the lock lever in an unlocked position according to various embodiments described herein.

The post collar 13 may comprise a collar mating surface 23 (FIGS. 3, 9, and 11), and the mounting post 14 may comprise both a lock notch 16 (FIGS. 3, 5, 7, 9-11, 13, and 15) and a post mating surface 22 FIGS. 3, 9, and 11. The post mating surface 22 may contact the collar mating surface 23 when the post collar 13 and mounting post 14 are mated together. A first retaining arm 24 (FIGS. 1-3, 7, 9-11, 13, and 15) and a second retaining arm 25 (FIGS. 1-3, 5, 7, 8-15) may both be coupled to the post collar 13. A lock bar 15 (FIGS. 1-3, 5, 7, 8-11, 13, and 15), having a first end 15A (FIGS. 1, 9, 10, 13, and 15) and a second end 15B (FIGS. 1, 9, 10, 13, and 15) may be coupled to the post collar 13. The first end 15A may be movably coupled to the first retaining arm 24 and the second end 15B may be movably coupled to the second retaining arm 25. A lock lever 17 may be coupled to the first end 15A of the lock bar 15, and the lock lever 17 may be movable between a locked position 71 (FIGS. 1, 6-8, 14, and 15) and an unlocked position 72 (FIGS. 2-5 and 9-13). The lock bar 15 may be moved into the lock notch 16 when the lock lever 17 is moved into the locked position 71 when the post collar 13 and mounting post 14 are mated together as shown in (FIGS. 1, 2, 4-8, 10, and 12-15). Conversely, the lock bar 15 may be moved out of the lock notch 16 when the lock lever 15 is moved into the unlocked position 72 when the post collar and mounting post are mated together.

Turning now to FIGS. 1-7,10-15 and in some embodiments, the system 100 may comprise a camera mount 11 which may be coupled to a post collar 13 and the system 100 may comprise a base 12 which may be coupled to a mounting post 14. A lock bar 15 may be movably coupled to the post collar 13. The mounting post 14 may comprise a lock notch 16 which may be configured to receive a portion of the lock bar 15 when the post collar 13 is mated to the mounting post 14. A lock lever 17 may be movably coupled to the lock bar 15 which may move a portion of the lock bar 15 into the lock notch 16 when the post collar 13 is mated to the mounting post 14 thereby coupling the camera mount 11 to the base 12. The camera mount 11 may be uncoupled from the base 12 by moving the lock lever 17 into the unlocked position 72 to remove the lock bar 15 from the lock notch 16 and then by separating the mounting post 14 from the post collar 13.

In some embodiments, a camera mount 11 may comprise one or more prongs 18, such as two outside prongs 18A (FIGS. 1, 9, and 10) and one or more inside prongs 18B (FIGS. 1, 9, and 10), with each prong 18 having a fastener aperture 21. One or more slots 19 may be located between two prongs 18. The slots 19 and prongs 18 may be configured to attach to a similarly shaped cavity and to two similarly shaped prongs, which typically comprise fastener apertures, and which are found on cameras and camera cases common in the art. The prongs of a camera case, camera, or other device may be placed into the slots 19 and in contact with the prongs 18 of the camera mount 11 so that the fastener apertures of the prongs of a camera case, camera, or other device may be aligned with the fastener apertures 21 of the camera mount 11. A fastener such as a screw or bolt may be passed through the aligned fastener apertures to couple or secure the camera case, camera, or other device to the camera mount 11 of the system 100. The fastener may be secured by a nut type fastener to allow a camera case, camera, or other device secured to the camera mount 11 to swivel or rotate around the axis provided by the fastener. In preferred embodiments, a camera mount 11 may comprise three prongs 18. In further embodiments, one or more prongs 18 and/or slots 19 may comprise any size or shape configured to receive and secure one or more prongs or other similar attachment points found on cameras, camera cases, and like devices common in the art.

A base 12 may be configured to be coupled or attached to a plurality of surfaces and objects. In some embodiments, a base 12 may comprise a shape which is complementary to a surface to which the base 12 is desired to be attached. For example, a base 12 may comprise a generally planar rectangular prism shape as shown in FIGS. 1-9 to facilitate contact between the base 12 and a surface or object comprising a generally flat planar shape. In other embodiments, a base 12 may comprise a generally convex curved shape to facilitate contact between the base 12 and a surface or object comprising a generally concave curved shape. It should be understood to one of ordinary skill in the art that the base 12 may be configured in a plurality of sizes and shapes including "T" shaped, "X" shaped, square shaped, rectangular shaped, cylinder shaped, cuboid shaped, hexagonal prism shaped, triangular prism shaped, or any other geometric or non-geometric shape, including combinations of shapes.

Referring now to FIGS. 3, 5, 7, 9-11, 13, and 15, a mounting post 14 may comprise a lock notch 16 which may be configured to receive a portion of a lock bar 15 when the post collar 13 is mated to the mounting post 14 and the lock lever 17 in the locked position 71 (FIGS. 1, 6-8, 14, and 15). The lock notch 16 may be configured to receive a portion of a lock bar 15, by comprising a shape such as a depression, channel, or the like, into which a portion of the lock bar 15 may be moved into. In some embodiments, a mounting post 14 may comprise a generally cylindrical shape. One or more post mating surfaces 22 may be positioned on the mounting post 14 which may contact a collar mating surface 23 on a post collar 13 when the mounting post 14 and post collar 13 are mated together as shown in FIGS. 1, 2, 4-8, 10, and 12-15. In other embodiments, a mounting post 14 may be configured in any other shape to form a post mating surface 22 which is complementary in shape to the collar mating surface 23 of a post collar 13.

As shown in FIGS. 3, 5, 7, 9-11, 13, and 15, in some embodiments, a lock notch 16 may comprise a notch, channel, depression, or the like which may be shaped to receive a portion of the lock bar 15 and which may be positioned anywhere on a mounting post 14. In preferred embodiments, a lock notch 16 may extend completely around or encircle a mounting post 14 thereby allowing the lock bar 15 to remain in the lock notch 16 as the lock bar is rotated around the mounting post 14. In other embodiments, one or more lock notches 16 may positioned on and/or around a mounting post 14. A lock notch 16 may be complementary in shape to a portion of a lock bar 15 so that a portion of the lock bar 15 may be received in the lock notch 16. For example, a lock bar 15 may comprise a generally cylindrical shape and a lock notch 16 may comprise a generally concave shape thereby allowing a convex portion of the lock bar 15 to be received in a concave portion of the lock notch 16. In other embodiments, a lock bar 15 and a lock notch 16 may be configured in any other shape or combination of shapes so that a portion of the lock bar 15 may be received in a complementary shaped portion of the lock notch 16.

A post collar 13 may be removably coupled, mated, or engaged to a mounting post 14 as shown in FIGS. 1, 2, 4-8, 10, and 12-15 so that portions of the mounting post 14 are received by the post collar 13. In some embodiments, a post collar 13 may comprise a first retaining arm 24 and a second retaining arm 25. In further embodiments, the retaining arms 24, 25, may be made from a resilient or flexible material, such as rubber, plastic, metal, and the like, allowing portions of the retaining arms 24, 25, to flex and be squeezed or drawn together. In other embodiments, the retaining arms 24, 25, may be made from any other material and/or may optionally be movably coupled to the post collar 13, such as with a hinged or pivoting coupling to allow portions of the retaining arms 24, 25, to be squeezed or drawn together.

The post collar 13 may comprise a collar mating surface 23 and optionally each retaining arm 24, 25, may comprise a collar mating surface 23. In some embodiments, one or both of the retaining arms 24, 25, may be drawn or flexed towards the other retaining arm 24, 25, and when drawn together, the shape of a collar mating surface 23 of the post collar 13 may optionally be decreased so that the collar mating surface 23 may squeeze onto the post mating surface 22 of a mated mounting post 14. For example, the first retaining arm 24 may be moved towards the second retaining arm 25 when the lock lever 17 is moved into the locked position 71 and/or the second retaining arm 25 may be moved towards the first retaining arm 24 when the lock lever 17 is moved into the locked position 71. Optionally, the mounting post 14 may be removably coupled to the post collar 13 by the frictional engagement provided by the squeezing of the collar mating surface 23 onto the post mating surface 22 with or without the lock bar 15 being moved into the lock notch 16.

Preferably, a collar mating surface 23 and a post mating surface 22 may be complementary in shape to each other. By mating the mounting post 14 and post collar 13 together as shown in FIGS. 1, 2, 4-8, 10, and 12-15, a post mating surface 22 of the mounting post 14 may contact a collar mating surface 23 of the post collar 13. In some embodiments, the mounting post 14 may comprise a generally cylindrical shape with a convex shaped post mating surface 22 and the post collar 13 may comprise a concave shaped collar mating surface 23, thereby allowing the collar mating surface 23 to extend around and contact portions of the post mating surface 22 when the mounting post 14 and post collar 13 are mated together. In other embodiments, a collar mating surface 23 may comprise any other shape, including texturing, configured to extend around and contact portions of the post mating surface 22 when the mounting post 14 and post collar 13 are mated together.

A lock lever 17 may be movably coupled to the lock bar 15 which may move a portion of the lock bar 15 into the lock notch 16 when the post collar 13 is mated to the mounting post 14 thereby coupling the camera mount 11 to the base 12. In some embodiments, the lock bar 15 may be received by the retaining arms 24, 25, by extending through a portion of each retaining arm 24, 25, such as through a first arm aperture 26 in the first retaining arm 24 and a second arm aperture 27 in the second retaining arm 25. Optionally, an arm aperture 26, 27, may be open so that the lock bar 15 may be slid or moved sideways out of the arm aperture, such as the depicted open first arm aperture 26. Optionally, an arm aperture 26, 27, may be closed so that the lock bar 15 may be slid or moved sideways out of the arm aperture such as the depicted closed second arm aperture 27. In further embodiments, a lock lever 17 may be coupled to a first end 15A of the lock bar 15 and a tension element 28 may be coupled to a second end 15B of the lock bar 15 with the portions of the retaining arms 24, 25, receiving the lock bar 15 positioned between the lock lever 17 and the tension element 28. When the lock bar 15 is received by the retaining arms 24, 25, the lock lever 17 may contact and rest against a retaining arm 24 and the tension element 28 may contact and rest against the other retaining arm 25.

A lock lever 17 may be movably coupled to the lock bar 15, such as by being pivotally coupled with a pivot pin 29, and may be moved or pivoted between a locked position 71 (FIGS. 1, 6-8) and an unlocked position 72 (FIGS. 2-5, 9). A pivot pin 29 may optionally be formed by a pin which may extend through the lock lever 17 and the lock bar 15 or any other suitable pivoting fastener or movable coupling method. A lock lever 17 may comprise a cam lobe 31 (FIGS. 1-3, 5, 7, 9, 13, and 15) which may contact a portion of a retaining arm 24. The pivot pin 29 may be offset from the cam lobe 31 so that when the lock lever 17 is in the unlocked position 72 both the pivot pin 29 and the cam lobe 31 may be a similar distance from the retaining arm 24, proximate to the lock lever 17. The lock lever 17 may be pivoted or moved into the locked position 71 which causes the cam lob 31 to be moved closer to the retaining arm 24 while the pivot pin 29 may be moved further from the retaining arm 24. When in the locked position 71, the cam lobe 31 may press against the first retaining arm 24, optionally with a pressure which may be adjusted by adjusting the positioning of the tension element 28 on the lock bar 15, to preferably squeeze portions of the first retaining arm 24, such as a collar mating surface 23 (FIGS. 3, 9, and 11), onto portions of the mounting post 14, such as a post mating surface 22 (FIGS. 3, 9, and 11), to ultimately retain the lock lever 17 in the locked position 71.

In some embodiments and as illustrated in FIGS. 1-9, the pivot pin 29 may couple the lock lever 17 to the first end 15A of the lock bar 15 with the first end 15A positioned in and through the first arm aperture 26 so that the cam lobe 31 is in contact or proximate with the first retaining arm 24 and with the second end 15B positioned in and through the second arm aperture 27 so that the tension element 28 is in contact or proximate with the second retaining arm 25. In other embodiments, the lock lever 17 may be pivotally or movably coupled to the lock bar 15 with any other suitable coupling method.

The lock bar 15 may be movable within the arm apertures 26, 27, and not coupled directly to the retaining arms 24, 25, of the post collar 13. In other embodiments, and as depicted in FIGS. 10-15, the pivot pin 29 may couple the lock lever 17, the first end 15A of the lock bar 15, and the first retaining arm 24 together with the first end 15A positioned in and through the first arm aperture 26 so that the cam lobe 31 is in contact or proximate with the first retaining arm 24 and with the second end 15B positioned in and through the second arm aperture 27 so that the tension element 28 is in contact or proximate with the second retaining arm 25. The pivot pin 29 may couple the lock bar 15 and/or lock lever 17 to the first retaining arm 24 optionally by inserting the pivot pin 29 into or through a pivot pin aperture 30 (FIGS. 1 and 11) which may be an open aperture, as depicted, or a closed aperture. The pivot pin 29 may pivot within the pivot pin aperture 30 thereby movably coupling the lock bar 15 and/or lock lever 17 to the first retaining arm 24. In this manner the lock bar 15 may be movable within the arm apertures 26, 27, and coupled directly to the first retaining arm 24 of the post collar 13.

In some embodiments, one or more retaining arms 24, 25, may be flexible or movable and when the lock lever 17 is moved into the locked position 71, the one or more retaining arms 24, 25, may be drawn or flexed together between the tension element 28 and the cam lobe 31, as the cam lob 31 presses on the retaining arm 24 while the pivot pin 29 draws the tension element 28 against the other retaining arm 25. By mating a collar mating surface 23 of the post collar 13 to a post mating surface 22 of the mounting post 14 and then moving the lock lever 17 into the locked position 71, the shape of the collar mating surface 23 may be decreased to increase the frictional resistance between the collar mating surface 23 and the post mating surface 22. In some embodiments, when in the locked position 71, the frictional resistance between the collar mating surface 23 and the post mating surface 22 may prevent the collar mating surface 23 from moving relative to the post mating surface 22. In further embodiments, when in the locked position 71, the frictional resistance between the collar mating surface 23 and the post mating surface 22 may hinder, but not prevent, the collar mating surface 23 from moving relative to the post mating surface 22. For example, the mounting post 14 may be rotated while in contact or engaged with the post collar 13 preferably while the lock lever is in the unlocked position 72.

In some embodiments, a tension element 28 may be coupled to a second end 15B of the lock bar 15 opposite to the first end 15A of the lock bar 15 to which the lock lever 17 may be coupled. A tension element 28 may be positioned to contact a second retaining arm 25. In further embodiments a tension element 28 may be movably coupled to an end of the lock bar 15 so that the position of the tension element 28 on the lock bar 15 may be changed. For example, the tension element 28 and the second end 15B may comprise threading 34 (FIG. 5) and the tension element 28 may be threadedly coupled to the lock bar 15 so that by rotating the tension element 28 in a first direction the tension element 28 may be moved closer to the lock lever 17 and by rotating the tension element 28 in a second direction the tension element 28 may be moved farther to the lock lever 17.

By changing the position of the tension element 28 on the lock bar 15 the distance the retaining arms 24, 25, may be optionally drawn together when the lock lever 17 is moved to the locked position 71 (FIGS. 1, 6-8) may be changed. The closer the tension element 28 is to the lock lever 17, the more pressure a cam lobe 31 may exert on the first retaining arm 25 when the lock lever 17 is moved between the locked position 71 and the unlocked position 72. This pressure may help prevent the lock lever 17 from inadvertently moving between the locked position 71 and the unlocked position 72. This pressure may help prevent the lock lever 17. Additionally, the closer the tension element 28 is to the lock lever 17, the greater the frictional resistance between the collar mating surface 23 of a post collar 13 that comprises one or more flexible retaining arms 24, 25, and the post mating surface 22 when the lock lever 17 is moved to the locked position 71. The farther the tension element 28 is from the lock lever 17 the lesser the frictional resistance between the collar mating surface 23 and the post mating surface 22 when the lock lever 17 is moved to the locked position 71. In alternative embodiments, a tension element 28 may be coupled at a fixed position on the lock lever 17.

Turning now to FIGS. 4-7 and 12-15, the movement of the lock bar 15 into and out of the lock notch 16 is perhaps best illustrated. FIGS. 4, 5, 12, and 13 show an example of a quick connect camera mounting system 100 with the lock lever 17 in an unlocked position 72 with sectional lines 5-5 and 13-13 bisecting the lock notch 16 according to various embodiments described herein. The post collar 13 may be mated to the mounting post 14 by inserting the mounting post 14 into the post collar 13 until the one or more collar mating surfaces 23 of the post collar 13 are in contact with the post mating surfaces 22 of the mounting post 14 so that the lock bar 15 is positioned proximate the lock notch 16 while the lock lever 17 is in the unlocked position 72 (FIGS. 2-5, 9-13). In some embodiments, while the lock lever 17 is in the unlocked position 72 a portion of the lock bar 15 may optionally be moved into contact or into the lock notch 16 when the post collar 13 is mated to the mounting post 14 while allowing the post mating surfaces 22 and the collar mating surfaces 23 to move relative to each other such as by rotating.

FIGS. 6, 7, 14, and 15 depict an example of a quick connect camera mounting system 100 with the lock lever 17 in a locked position 71 with sectional lines 7-7 and 15-15 bisecting the lock notch 16 according to various embodiments described herein. While the post collar 13 is mated to the mounting post 14, the lock lever 17 may be moved to the locked position 71 (FIGS. 1, 6-8, 14, and 15). As the lock lever 17 is moved, the retaining arms 24, 25, may optionally be drawn together between the tension element 28 and the cam lobe 31 as the cam lob 31 presses on the first retaining arm 24 while the pivot pin 29 draws the tension element 28 against the second retaining arm 25. Also, as the lock lever 17 is moved into the locked position 71, the lock bar 15 may be moved into the lock notch 16. In some embodiments, the lock bar 15 may be moved into contact with the lock notch 16. In other embodiments, the lock bar 15 may be moved into the lock notch 16 but not in contact with the lock notch 16.

Optionally, as the lock lever 17 is moved into the locked position 71, the shape of the collar mating surface 23 may be decreased to increase the frictional resistance between the collar mating surface 23 and the post mating surface 22 to hinder or prevent the collar mating surfaces 23 and the post mating surfaces 22 from moving relative to each other. The shape of the collar mating surface 23 may be decreased as a retaining arm 24, 25, is moved or flexed towards the other retaining arm 24, 25. In further embodiments, as the lock lever 17 is moved into the locked position 71, the lock bar 15 may also be moved into contact with the lock notch 16. In this manner, by mating the mounting post 14 to the post collar 13 and moving the lock lever 17 from the unlocked position 72 (FIGS. 2-5, 9) to the locked position 71 (FIGS. 1, 6-8), the mounting post 14 and the post collar 13, and therefore the camera mount 11 and base 12, may be quickly connected or coupled together. Also, by moving the lock lever 17 from the locked position 71 to the unlocked position 72 and by separating the mounting post 14 and the post collar 13, the mounting post 14 and the post collar 13, and therefore the camera mount 11 and base 12, may be quickly disconnected or uncoupled from each other.

Turning now to FIGS. 8 and 9 an alternative example of a disconnected quick connect camera mounting system 100 according to various embodiments described herein. In some embodiments, the system 100 may comprise a camera mount 11 which may be coupled to a mounting post 14 and a base 12 which may be coupled to a post collar 13. A lock bar 15 may be movably coupled to the post collar 13. The mounting post 14 may comprise a lock notch 16 which may be configured or shaped to receive a portion of the lock bar 15 when the post collar 13 is mated to the mounting post 14. A lock lever 17 may be movably coupled to the lock bar 15. The lock lever 17 may move a portion of the lock bar 15 into the lock notch 16 when the post collar 13 is mated to the mounting post 14 and when the lock lever 17 is moved into the locked position 71 thereby coupling the camera mount 11 to the base 12. The camera mount 11 may be uncoupled from the base 12 by moving the lock lever 17 into the unlocked position 72 to remove the lock bar 15 from the lock notch 16 and then by separating the mounting post 14 from the post collar 13.

Referring now to FIGS. 12-15, in some embodiments, the system 100 may comprise a first retaining fastener 32 (FIGS. 13 and 15) and a second retaining fastener 33 (FIGS. 12, 13, and 15) which may be configured to be removably coupled to each other. A first retaining fastener 32 may be positioned or disposed on the lock lever 17, and/or optionally on the post collar 13, while the second retaining fastener 33 may be positioned or disposed on the post collar 13 and/or optionally on the lock lever 17.

In some embodiments, the second retaining fastener 33 may be shaped or configured as a barb or catch and the first retaining fastener 32 may be shaped or configured as a depression or the like which is complementary in shape to the second retaining fastener 33 so that the second retaining fastener 33 may be removably coupled into the first retaining fastener 32 by being press-fit or snap-fit. In this manner, when the retaining fasteners 32, 33, are removably coupled together, portions of the lock lever 17 and post collar 13 may be removably coupled together thereby preventing the lock lever 17 from inadvertently moving out of the locked position 71.

In alternative embodiments, a first retaining fastener 32 and a second retaining fastener 33 may be or comprise magnetic fasteners, threaded fasteners, hook and loop type or Velcro® fasteners, or any other type of fasteners which are configured to be removably coupled together and suitable for removably coupling portions of the lock lever 17 and post collar 13 together thereby preventing the lock lever 17 from inadvertently moving out of the locked position 71.

While some materials have been provided, in other embodiments, the elements that comprise the system 100 such as the camera mount 11, base 12, post collar 13, mounting post 14, lock bar 15, lock lever 17, and/or tension element 28 may be made from durable materials such as aluminum, steel, other metals and metal alloys, wood, hard rubbers, hard plastics, fiber reinforced plastics, carbon fiber, fiber glass, resins, polymers or any other suitable materials including combinations of materials. Additionally, one or more elements may be made from or comprise durable and slightly flexible materials such as soft plastics, silicone, soft rubbers, or any other suitable materials including combinations of materials. In some embodiments, one or more of the elements that comprise the system 100 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the system 100 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, slide-to-lock type connection method or any other suitable temporary connection method as one reasonably skilled in the art could envision to serve the same function. In further embodiments, one or more of the elements that comprise the system 100 may be coupled by being one of connected to and integrally formed with another element of the system 100.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A quick connect camera mounting system, the system comprising:
   a. a post collar coupled to a camera mount, wherein the post collar comprises a collar mating surface;
   b. a first flexible retaining arm coupled to the post collar;
   c. a second flexible retaining arm coupled to the post collar and configured to flexibly move both towards and away from the first flexible retaining arm;
   d. a lock bar having a first end and a second end, wherein the first end is movably coupled to the first retaining arm, and wherein the second end is movably coupled to the second retaining arm;
   e. a mounting post coupled to a base, wherein the mounting post is configured to be mated to the post collar, wherein the mounting post comprises a lock notch formed as a concave shaped depression encircling the mounting post and the mounting post further comprising a post mating surface, and wherein the post mating surface contacts the collar mating surface when the post collar and mounting post are mated together; and
   f. a lock lever coupled to the first end of the lock bar, wherein the lock lever is movable between a locked position and an unlocked position, wherein the lock bar comprises a convex shaped surface which is moved into the concave shaped depression of the lock notch when the lock lever is moved into the locked position when the post collar and mounting post are mated together, and wherein the lock bar is moved out of the lock notch when the lock lever is moved into the unlocked position when the post collar and mounting post are mated together.

2. The system of claim 1, wherein the first retaining arm comprises a first arm aperture, and wherein the first end of the lock bar is movably coupled within the first arm aperture.

3. The system of claim 1, wherein the second retaining arm comprises a second arm aperture, and wherein the second end of the lock bar is movably coupled within the second arm aperture.

4. The system of claim 1, wherein the lock bar comprises a tension element coupled to the second end of the lock bar opposite to the lock lever.

5. The system of claim 4, wherein the tension element is threadedly coupled to the second end of the lock bar outside of the second flexible retaining arm, and wherein the position of the tension fastener on the second end of the lock bar is changed by rotating the tension fastener.

6. The system of claim 1, wherein the lock lever comprises a cam lobe.

7. The system of claim 1, wherein the camera mount comprises a prong and a slot.

8. The system of claim 1, wherein the first flexible retaining arm is flexed towards the second flexible retaining arm when the lock lever is moved into the locked position.

9. The system of claim 1, wherein the second flexible retaining arm is moved towards the first flexible retaining arm when the lock lever is flexed into the locked position.

10. The system of claim 1, wherein the collar mating surface and post mating surface are frictionally engaged with each other when the lock lever is moved into the locked position.

11. A quick connect camera mounting system, the system comprising:
  a. a post collar coupled to a base, wherein the post collar comprises a collar mating surface;
  b. a first fexible retaining arm coupled to the post collar;
  c. a second flexible retaining arm coupled to the post collar;
  d. a lock bar having a first end and a second end, wherein the first end is movably coupled to the first flexible retaining arm, and wherein the second end is movably coupled to the second flexible retaining arm;
  e. a mounting post coupled to a camera mount, wherein the mounting post is configured to be mated to the post collar, wherein the mounting post comprises a lock notch depression encircling a post mating surface, and wherein the post mating surface contacts the collar mating surface when the post collar and mounting post are mated together; and
  f. a lock lever coupled to the first end of the lock bar, wherein the lock lever is movable between a locked position and an unlocked position, wherein the lock bar is moved into the lock notch when the lock lever is moved into the locked position when the post collar and mounting post are mated together, and wherein the lock bar is moved out of the lock notch when the lock lever is moved into the unlocked position when the post collar and mounting post are mated together.

12. The system of claim 11, wherein the first flexible retaining arm comprises a first arm aperture, and wherein the first end of the lock bar is movably coupled within the first arm aperture.

13. The system of claim 11, wherein the second flexible retaining arm comprises a second arm aperture, and wherein the second end of the lock bar is movably coupled within the second arm aperture.

14. The system of claim 11, wherein the lock bar comprises a tension element coupled to the second end of the lock bar opposite to the lock lever and outside of the second flexible retaining arm.

15. The system of claim 14, wherein the tension element is threaddedly coupled to the second end of the lock bar, and wherein the position of the tension fastener on the second end of the lock bar is changed by rotating the tension fastener.

16. The system of claim 11, wherein the lock lever comprises a cam lobe.

17. The system of claim 11, wherein the camera mount comprises a prong and a slot.

18. The system of claim 11, wherein the first flexible retaining arm is flexed towards the second flexible retaining arm when the lock lever is moved into the locked position.

19. The system of claim 11, wherein the second flexible retaining arm is flexed towards the first flexible retaining arm when the lock lever is moved into the locked position.

20. The system of claim 11, wherein the collar mating surface and post mating surface are frictionally engaged with each other when the lock lever is moved into the locked position.

* * * * *